Sept. 8, 1964       J. L. LA POINTE ETAL       3,147,574
                    DIMENSIONAL CONTROL DEVICE
Filed June 29, 1962                              2 Sheets-Sheet 1

INVENTORS
JOHN J. FANNON, JR.
BY JOSEPH LEO LA POINTE
WILSON, SETTLE & CRAIG
ATTORNEYS

Sept. 8, 1964   J. L. LA POINTE ETAL   3,147,574
DIMENSIONAL CONTROL DEVICE

Filed June 29, 1962   2 Sheets-Sheet 2

INVENTORS
JOHN J. FANNON, JR.
BY JOSEPH LEO LAPOINTE
WILSON, SETTLE & CRAIG
ATTORNEYS

United States Patent Office 3,147,574
Patented Sept. 8, 1964

3,147,574
DIMENSIONAL CONTROL DEVICE
Joseph Leo La Pointe, Detroit, and John J. Fannon, Jr., Grosse Pointe, Mich., assignors to Hupp Corporation, a corporation of Virginia
Filed June 29, 1962, Ser. No. 206,481
4 Claims. (Cl. 51—165)

This invention relates to a dimensional control device, and more particularly to an electrical device for maintaining accurate size control of a workpiece during a cutting, grinding or other machine operation on the workpiece or for measuring or otherwise inspecting a workpiece.

In many industrial operations, it is desirable to gage a workpiece while the workpiece is being machined or while the workpiece is in motion. For example, in the manufacture of gas turbine engines, it is necessary to measure the outside diameter of the wheel and blade assemblies during the finish grinding operation on the blade tips. The blades of one type of gas turbine engine are loosely fitted in a slot broached in the rim of the wheel on which the blades are mounted. The grinding operation is accomplished while the wheel and blade assembly is rotated at high speed. Such rotation is necessary to assure sufficient centrifugal force to hold the blades tightly against their seats during the grinding operation in a manner similar to that actually encountered in use of the assembly. A gaging method which relies on physical contact with the blades while the blades are being rotated has proven to be impractical and also dangerous.

Other machining operations, such as finish grinding or honing, are desirably controlled while the operation is proceeding rather than after the operation has been finished. In the past, it has been common practice to machine in steps, a measurement being taken after each step to determine how extensive the next step should be. Such a method is time consuming and relatively inaccurate.

It is therefore an object of the present invention to provide a dimensional control device in the form of an electric gage for measurement of the dimensions of a workpiece without the necessity of physical contact with the workpiece.

An additional object of the invention is to provide such a dimensional control device which employs a linear variable differential transformer.

A further object of the invention is to utilize the linear variable differential transformer to permit the gaging of both magnetic and nonmagnetic materials.

Another object of the invention is to provide such a dimensional control device which has a high degree of accuracy and wide flexibility of application.

A still further object of the invention is to provide a dimensional control device which is rugged, being capable of withstanding the shock and vibration frequently encountered in machining operations.

Another object of the invention is to provide an electrical gaging device which is relatively simple to adjust.

Other objects of this invention will appear in the following description and appended claims, reference being had to the accompanying drawings forming a part of this specification wherein like reference characters designate corresponding parts in the several views.

In the drawings:

FIGURE 5 is a diagrammatic view of the device of FIGURE 1 utilized in connection with a more complex display and control circuit.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
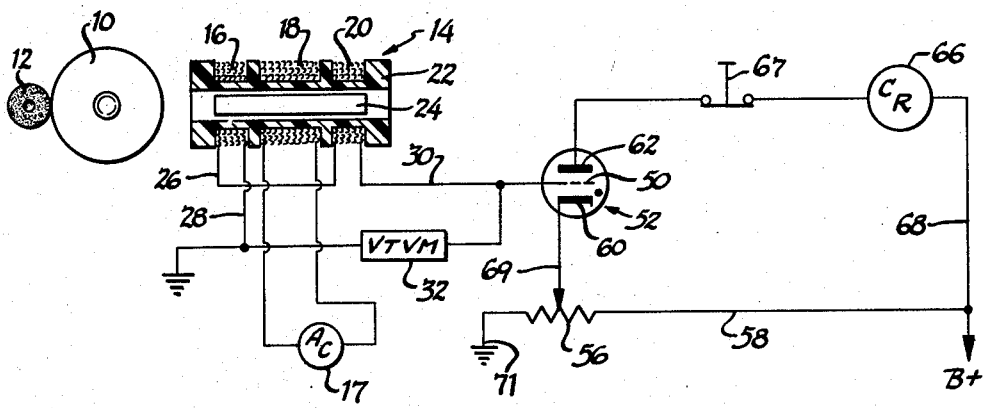
FIGURE 1 is an electrical schematic illustration of one embodiment of the present invention.

Referring to the drawings, FIGURE 1 illustrates the device of the present invention used in connection with a grinding operation. A workpiece 10 is illustrated as being finished ground by a grinding wheel 12. The sensing head 14 of the dimensional control device is positioned adjacent to the periphery of the workpiece 10. As material is ground off the workpiece 10, the peripheral surface of the workpiece will recede from the sensing head 14, resulting in relative motion between the sensing head and the workpiece. The amount of this relative motion is measured by the sensing head. When the desired amount of material has been ground off the workpiece 10, the sensing head will, via the associated electrical circuitry, cause the grinding operation to cease.

The sensing head is a linear variable differential transformer. This transformer is an electromechanical transducer which produces an electrical output proportional to the displacement of a separate movable core. As shown in FIGURE 1, three coils 16, 18, 20 are equally spaced on a hollow cylindrical coil form 22 fabricated from an insulating material. A magnetic core 24 is positioned axially inside the form 22 and provides a path for magnetic flux linking the coils.

The center coil 18 is the primary coil. When this coil is energized with alternating current from a source 17, voltages are induced in the two outer secondary coils 16, 20. The secondary coils 16, 20 are connected in series opposition by lead 26. The two voltages in the secondary circuit are consequently opposite in phase. The net output of the transformer is the difference in these voltages. Leads 28, 30 are connected to the coils 16, 20 to connect the output to the grid 50 of a thyratron tube 52. One of the leads 28 is grounded, the other lead 30 being connected to the grid 50. A vacuum tube voltmeter 32 is connected across the leads 28, 30.

For one central position of the core 24, the output voltage will be zero. This is the balance point or null position. When the core 24 is moved from the balance point, the voltage induced in the coil towards which the core is moved increases, while the voltage induced in the opposite coil decreases. This produces a differential voltage output from the transformer which varies linearly with change in core position. Motion of the core in the opposite direction beyond the null position produces a similar linear voltage characteristic, but with the phase shifted 180°. A continuous plot of voltage output versus core position appears as a straight line through the origin.

It has been found in accordance with the present invention, that the same linear variation in the voltage output from the coils 16, 20 may be obtained by positioning one of the transformer coils adjacent to an exterior metal object. The exterior metal object may be either of magnetic or nonmagnetic material.

Figure 3:
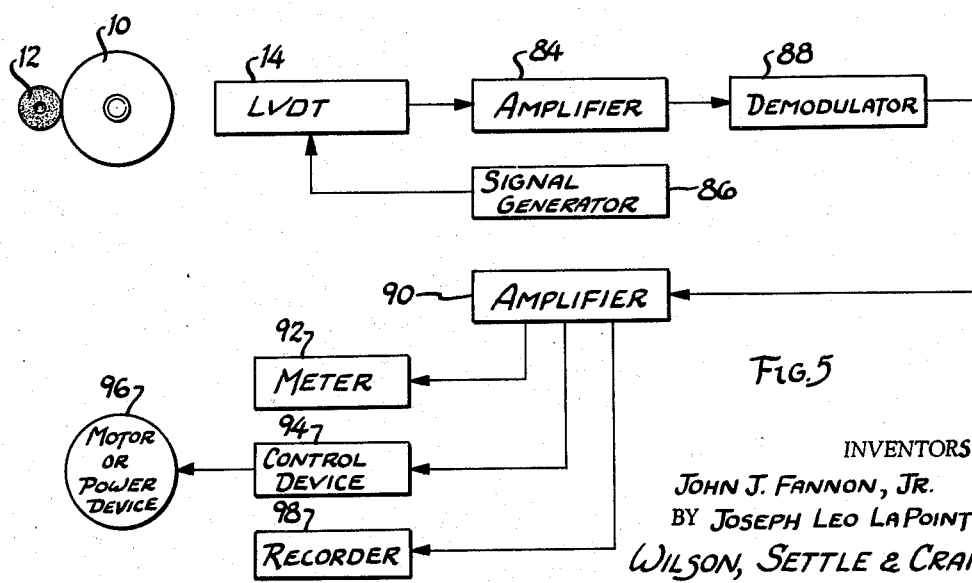
FIGURE 3 is a view of the linear variable differential transformer utilized in connection with gaging of a magnetic material.
Figure 3:
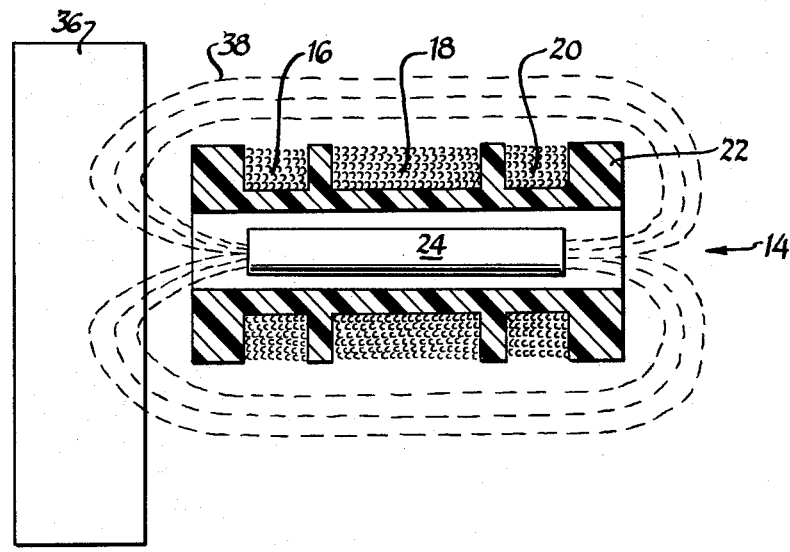

Referring to FIGURE 3, it will be noted that a magnetic metallic object 36 has been positioned adjacent to the coil 16. The object 36 provides a path for the magnetic flux 38 linking the coils, causing the field strength adjacent to the coil 16 to be increased, thus increasing the induced voltage in the coil 16.

It will be appreciated that if the object 36 is moved closer to the coil 16, that the voltage induced in the coil 16 will be further increased. Contrariwise, if the object 36 is moved away from the coil 16, the voltage induced in this coil will be decreased. Such increases and decreases are registered in the differential output of the coils 16, 20, the difference in output being translatable into linear measurements. If material is ground off the surface of the object 36, relative motion between the object and coil 16 will result, and an indication of how much material has been ground off will be measured by the change in the differential output voltage of the coils, 16, 20.

Figure 4:
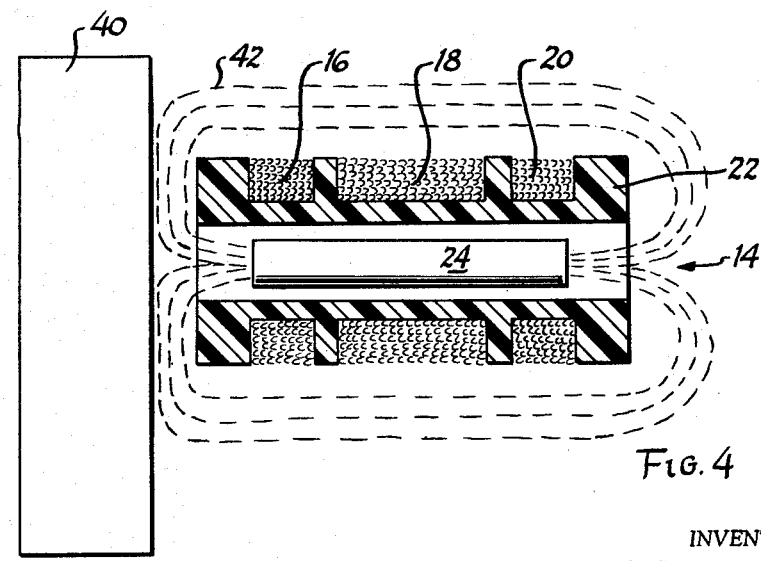
FIGURE 4 is a view similar to FIGURE 3 illustrating the use of the device in connection with nonmagnetic materials.

A similar phenomenon will also occur when a nonmagnetic metallic object, such as the object 40 illustrated in FIGURE 4, is placed adjacent to the coil 16. However, instead of inducing a larger voltage in the coil 16, the object 40 will cause a smaller voltage to be induced in the coil. A nonmagnetic object tends to act as a coil, creating a flux field in opposition to that inducing a voltage in the coil 16. Thus the flux 42 is distorted and the magnetic field inducing a voltage in coil 16 is weakened. The phase of the differential voltage of the coils 16, 20 is thus shifted 180°. Measurements taken in the case of nonmagnetic materials must consequently be read with the opposite sign.

When the device is set up for an operation on the workpiece 10, the core 24 is adjusted to the null position. The null position does, the course, vary in accorddance with the distnce of the coil 16 from the workpiece 10. Referring again to FIGURE 1, it will be appreciated that the voltmeter 32 will indicate the null position of the core 24. The voltmeter 32 may be calibrated in linear units to indicate visually the dimensions being measured.

Means are also provided to automatically control the motor driving the grinding wheel 12 to shut this motor off when sufficient material has been ground from the workpiece 10. As previously mentioned, the output of the coils 16, 20 is connected to the grid 50 of thyratron tube 52. The thyratron will fire when the input signal from the coils 16, 20 reaches a predetermined value. A voltage-dividing potentiometer 56 is provided in lead 58 which is connected to lead 68 and to the cathode 60 of the thyratron by lead 69. The potentiometer is grounded at 71. The potentiometer provides a variable bias voltage to the cathode. When the signal from the transformer 14 reaches a critical voltage, current will flow between the cathode 60 and the thyratron plate 62. The plate 62 is connected to B+ by the lead 63. A control relay 66 and manual switch 67 are positioned in the lead 68. The circuit is completed to the cathode by the lead 58. Switch 67 is provided to turn off the thyratron at the conclusion of an operation.

Figure 2:
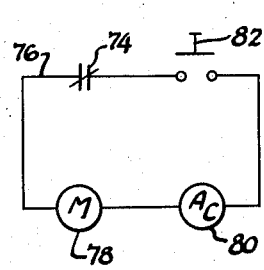
FIGURE 2 is an electrical schematic illustration of a control circuit used in conjunction with the circuit of FIGURE 1.

As shown in FIGURE 2, the relay 66 has a normally closed contact 74 positioned in lead 76 of a motor control circuit. The motor 78, which drives the grinding wheel 12, is positioned in this circuit. A source of power 80 is provided to normally energize the motor 78. Power is applied to the motor 78 by closing of manual switch 82. Upon firing of the thyratron tube 52, the relay 66 will be energized, with consequent opening of the contact 74. This will serve to de-energize the motor 78 and stop the grinding operation on the workpiece 10.

The circuitry illustrated in FIGURE 1 and 2 is, of course, simplified for the purpose of description. A more sophisticated circuitry may be provided as illustrated in FIGURE 5. As shown in FIGURE 5, the signal from the sensing head 14 is amplified in an amplifier 84. Additionally, rather than exciting the primary coil 18 with ordinary 60 c.p.s. current, the coil is energized at a higher frequency from a signal generator 86 which is desirable in some instances. Sensitivity and output generally increase with an increase in frequency. Additionally, response to vibration and rapid mechanical movement is improved if the excitation frequency is at least ten times the highest frequency present as a component of the mechanical motion. In a given application of the device, it is desirable to determine the optimum frequency for excitation. The vibration of the machinery or apparatus being utilized in connection with the workpiece should be considered in determining what the excitation frequency should be.

A demodulator 88 receives the signal from the amplifier 84 to demodulate the signal for further amplification. The demodulated signal from the demodulator 88 is fed to a second amplifier 90. The amplifier 90 may have a plurality of outputs. One output may be supplied to a meter 92 for initial set-up and to give a visual indication of the progress of the operation under consideration. A second output of the amplifier 90 may be fed to a control device 94. The control device 94 may include a thyratron and relay system as illustrated in FIGURE 1 or any other desired control mechanism. The function of the control device 94 is to control a motor or other power device 96. The device 96 will normally control an operation being performed upon a workpiece.

Another output of the amplifier 90 may be fed into a recording mechanism 98. The recording mechanism 98 may be utilized in checking, for example, the blade growth of the wheel and blade assembly of a gas turbine engine or the trueness of the outer periphery of a circular workpiece.

The use of the linear variable differential transformer is important in the present invention to achieve results which have not heretofore been possible. Such transformers have a very accurate output, high sensitivity and high output level, stepless variations in output, linear response characteristics which are maintained over wide load range, and a negligible output voltage variation. Previous devices have been proposed somewhat along the lines of the present invention. However, such previous devices have incorporated a bridge circuit which requires very sensitive balancing in order to provide the desired accuracy. In the use of the present invention, the transformer may be brought to a zero position quite simply by manipulation of the core 24.

Having thus described our invention, we claim:

1. A dimensional control device comprising a linear variable differential transformer including a form, a pair of secondary coils mounted in spaced apart relationship on the form, a primary coil mounted on the form between the secondary coils for inducing a voltage in the secondary coils, said secondary coils being connected in series opposition, means for taking the output of the secondary coils, means for associating a surface of a metallic workpiece adjacent to one of the secondary coils to establish an air gap therebetween, said metallic workpiece altering the induced voltage in said one adjacent secondary coil, and means to measure the difference in output voltage thus created in said two secondary coils to indicate the extent of the air gap between the surface of the metallic workpiece and said one adjacent secondary coil.

2. A dimensional control device comprising a linear variable differential transformer including a hollow form, a pair of secondary coils mounted in spaced apart relationship on the form, a primary coil mounted on the form between the secondary coils for inducing a voltage in the secondary coils, a movable core fabricated of magnetic material received in said hollow form, said secondary coils being connected in series opposition, means for taking the output of the secondary coils, said putout being the difference in voltage induced by the primary coil, said core being movable to a position where said output is zero, means for associating a surface of a metallic workpiece adjacent to one of the secondary coils to establish an air gap therebetween, said metallic workpiece altering the induced voltage in said one adjacent secondary coil, and means to measure the differences in output voltage thus created in said two secondary coils.

3. A dimensional control device comprising a linear variable differential transformer including a form, a pair of secondary coils mounted in spaced apart relationship on the form, a primary coil mounted on the form between the secondary coils for inducing a voltage in the secondary coils, said secondary coils being connected in series opposition, means for taking the output of the secondary coils, means for associating the surface of a moving metallic workpiece adjacent to one of the secondary coils to establish an air gap therebetween, said metallic workpiece altering the induced voltage in said one adjacent secondary coil, means for exciting the primary coil with an excitation frequency at least ten times the highest frequency present as a component of the mechanical motion of the metallic workpiece, and means to measure the difference in output voltage thus created in said two secondary coils to indicate the extent of the air gap between the surface of the metallic workpiece and said one adjacent secondary coil.

4. A dimensional control device comprising a linear variable differential transformer including a form, a pair of secondary coils mounted in spaced apart relationship on the form, a primary coil mounted on the form between the secondary coils for inducing a voltage in the secondary coils, said secondary coils being connected in series opposition, means for taking the output of the secondary coils, means for associating a surface of a metallic workpiece adjacent to one of the secondary coils to establish an air gap therebetween, said metallic workpiece altering the induced voltage in said one adjacent secondary coil, means for machining material from the metallic workpiece to thereby increase the air gap between the surface of the metallic workpiece and said one adjacent secondary coil, means to receive the difference in output voltage thus created in said two secondary coils, and means to discontinue operation of the means for machining material from the metallic workpiece when the air gap has increased to a predetermined size.

References Cited in the file of this patent
UNITED STATES PATENTS

| | | |
|---|---|---|
| Re. 18,889 | Sams et al. | July 4, 1933 |
| 2,023,777 | Balsiger | Dec. 10, 1935 |
| 2,915,699 | Mierendorf et al. | Dec. 1, 1959 |
| 3,019,565 | Hatstat et al. | Feb. 6, 1962 |